United States Patent
Olsen (10) Patent No.: US 6,922,605 B1
(45) Date of Patent: Jul. 26, 2005

(54) AUTOMATED FLUID-JET TILT COMPENSATION FOR LAG AND TAPER

(75) Inventor: John H. Olsen, Vashon, WA (US)

(73) Assignee: OMAX Corporation, Kent, WA (US)

( * ) Notice: Subject to any disclaimer, the term of this patent is extended or adjusted under 35 U.S.C. 154(b) by 83 days.

(21) Appl. No.: 10/683,798

(22) Filed: Oct. 10, 2003

(51) Int. Cl.$^7$ ............................................... G06F 19/00
(52) U.S. Cl. ...................... 700/160; 700/159; 700/181; 83/177
(58) Field of Search ........................... 700/90, 95, 159, 700/160, 181, 275, 281; 83/72, 177

(56) References Cited

U.S. PATENT DOCUMENTS

| | | |
|---|---|---|
| 5,508,596 A | 4/1996 | Olsen |
| 5,892,345 A | 4/1999 | Olsen |
| 6,705,921 B1 * | 3/2004 | Shepherd ...................... 451/2 |
| 2003/0065424 A1 | 4/2003 | Erichsen et al. |

OTHER PUBLICATIONS

Jetting Technology, Cutting–Edge Quality Improvements through geometrical modelling;; Henning et al, Fraunhofer–Institute for Manufacturing Engineering and Automation, Stuttgart, Germany, Sep. 21–23, 1998; pp 321–329.
Jetting Technology, Better Cutting with Jetting: 14$^{th}$ International Conference, Brugge, Belgium: Sep. 21–23, 1998, pp 1–6 (various authors).

J. Olsen et al., Advanced Error Correction Methodology Applied to Abrasive Waterjet Cutting; 2003 WJTA American Water Jet Conference; Omax Corporation, Kent, Washington, USA, Aug. 2003; pp 1–15.

Proceedings of the 9th American Waterjet Conference, Mohamed Hashish, Ph.D., Waterjet Technology Association, Aug. 23–26, 1997, Dearborn, MI, vol. 1, pp 1–27, 133–144, 211–302; 729–782.

* cited by examiner

Primary Examiner—Jayprakash N. Gandhi
(74) Attorney, Agent, or Firm—Graybeal Jackson Haley LLP

(57) ABSTRACT

A computerized method for determining a tilt parameter of a cutting head of a fluid-jet apparatus. The method includes receiving a target-piece shape, describing an ordered path defining the target-piece shape, and segmenting the path into small straight lines of approximately equal length. The method further includes determining a cutting-head translation speed for each of the small straight lines, determining a tilt parameter of the cutting head with respect to the plane of the workpiece in response to the speed and a fluid jet-shape parameter for each of the small straight lines, storing the small straight lines and the determined tilt parameter associated with each small straight line in a memory, and sending the stored data to the fluid-jet apparatus. The method may include controlling the tilt of the cutting head in accordance with the tilt parameter for each small straight line as the cutting head cuts the workpiece.

25 Claims, 7 Drawing Sheets

AUTOMATED FLUID-JET TILT COMPENSATION FOR LAG AND TAPER

FIELD OF THE INVENTION

The present invention relates to tilting a cutting head of a fluid-jet apparatus, and in particular to computerized methods and systems for determining and controlling a tilt parameter of the cutting head relative to a plane of the workpiece to compensate for lag and taper.

BACKGROUND

The use of high-velocity, abrasive-laden liquid jets to precisely cut a variety of materials is well known. Briefly, a high-velocity liquid jet is first formed by compressing the liquid to an operating pressure of between 35,000 and 60,000 psi, and forcing the compressed liquid through an orifice having a diameter approximating 0.007–0.015 inch. The resulting highly coherent jet is discharged from the orifice at a velocity that approaches or exceeds the speed of sound. The liquid most frequently used to form the jet is water, and the high-velocity jet described hereinafter may accordingly be identified as a "water-jet," a "waterjet," or a "fluid-jet." Numerous liquids other than water can be used without departing from the scope of the invention, and any recitation of the jet as comprising water should not be interpreted as a limitation. For example, fluids other than water can also be employed to cut materials that cannot be in contact with water. The customary terms for this process are "water-jet cutting" or "fluid-jet cutting." This document will refer to "fluid-jet cutting" and the like not intending to exclude cutting by jets of fluid other than water.

To enhance the cutting power of the fluid-jet, abrasive materials are added to the fluid-jet stream to produce an abrasive-laden fluid-jet, typically called an "abrasive fluid-jet" or an "abrasive jet." The abrasive fluid-jet is used to cut a wide variety of materials from exceptionally hard materials (such as tool steel, aluminum, cast-iron armor plate, certain ceramics and bullet-proof glass) to soft materials (such as lead). Abrasive fluid-jets can accomplish the cutting of intricate slots, through cuts and curves cut in metals, glass, stone, composites, and similar materials. For cutting metals, abrasive grit from a hopper at ambient air pressure is added to the fluid-jet stream prior to the impact of the jet on the workpiece. Typical abrasive materials include garnet, silica, and aluminum oxide having grit sizes ranging between approximately #36 and approximately #220.

The material forming the fluid-jet is an orifice defined in a hard jewel held in a mount. The jewel is typically a sapphire, ruby or diamond. To produce an abrasive-laden fluid-jet, the fluid-jet passes through a "mixing region" in a nozzle wherein a quantity of abrasive is entrained into the fluid-jet by the low-pressure region that surrounds the flowing liquid in accordance with the Venturi effect. The abrasive, which is under atmospheric pressure in an external hopper, is drawn into the mixing region by the lower pressure region through a conduit that communicates with abrasive contained in a hopper. The resulting abrasive-laden fluid-jet is then discharged against a workpiece through a nozzle tip that is supported closely adjacent to the workpiece.

The typical technique for cutting by fluid-jet is to mount the workpiece (sometimes also referred to as the "material being cut") in a suitable jig, or other means for securing the workpiece, into position on an X–Y table. The fluid-jet is typically directed onto the workpiece to accomplish the desired cutting to produce a target piece having a shape and is generally under computer or robotic control. The cutting power is typically generated by means of a high-pressure pump connected to the cutting head through high-pressure tubing, hose, piping, accumulators, and filters. It is not necessary to keep the workpiece stationary and to manipulate the fluid-jet cutting tool. The workpiece can be manipulated under a stationary cutting jet, or both the fluid-jet and the workpiece can be manipulated to facilitate cutting.

Figure 1A:
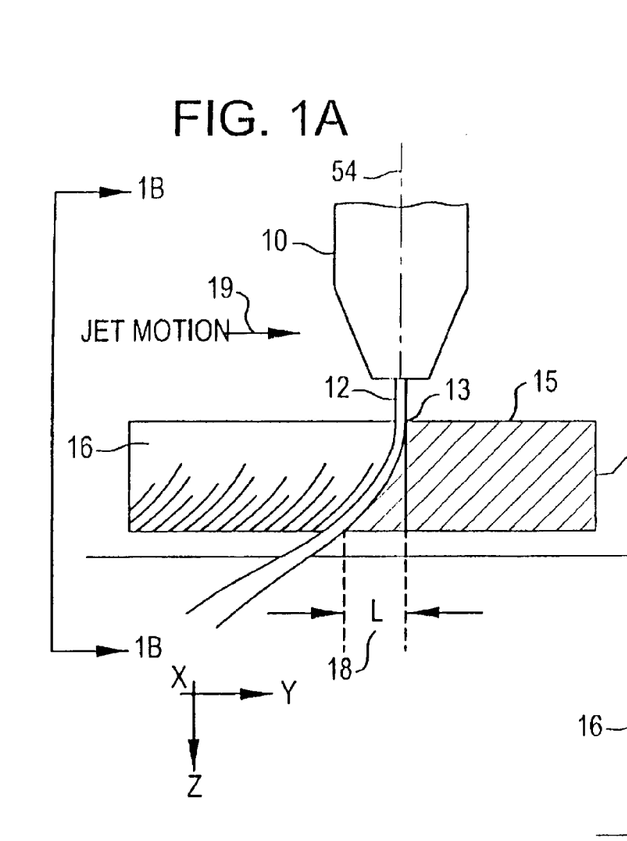
FIG. 1A illustrates a fluid-jet cutting a workpiece and a resulting lag of a deflection distance in the jet in a direction opposite of jet motion.

A cut produced by a fluid-jet has characteristics that differ from cuts produced by traditional machining processes. Two of these characteristics include lag (also referred to as jet-lag) and taper. FIG. 1A illustrates a fluid-jet 12 cutting a workpiece 14, and a resulting lag 18 by a deflection distance L in the jet 12 in a direction opposite of jet motion 19. Every fluid-jet application is affected to some extent by the lag 18 of the fluid-jet 12 stream from a longitudinal axis 54 as the nozzle 10 moves across the workpiece 14 at a translation speed in a direction indicated by the motion 19. The faster the nozzle 10 moves, the more the fluid-jet 12 is bent by the structure of the workpiece 14 away from longitudinal axis 54. When the motion 19 of the nozzle 10 is a straight line, the fluid-jet 12 stream cuts the material of the workpiece 14 the way a wheel cutter might cut with the stream exiting the bottom of the workpiece 14 at the deflection distance L behind the place of impact 13 where the fluid-jet stream enters the workpiece. On straight cuts, the stream 12 can be moved swiftly across the workpiece 14 because the stream's deflection L is directly inline with and behind the place of impact 13, and does not affect cutting accuracy. However, on corners, the deflection 18 of the cutting-jet by the deflection distance L can cause cutting errors as it flares to the outside of a corner leaving behind or cutting undesirable deflection tapers. Also, if the jet is rapidly accelerated around a sharp corner, it may leave an uncut region and it may deflect so as to create a trough in the underside of a part 14 on the outside of the corner.

In straight-line cutting, the lag 18 is a function of the cutting-head translation speed, and a high lag causes the jet to flop from side to side resulting in a poor finish. This sets a maximum speed for the cut given a finish requirement. However, a rapid acceleration, even within the speed limit, will also cause a mark to be made on the surface. This places a constraint on the rate of change of cutting-head translation speed along the cut. Within these constraints, one wishes to move as quickly as possible to minimize the cutting time and to avoid excessive kerf caused by stopping or moving very slowly.

Figure 1B:
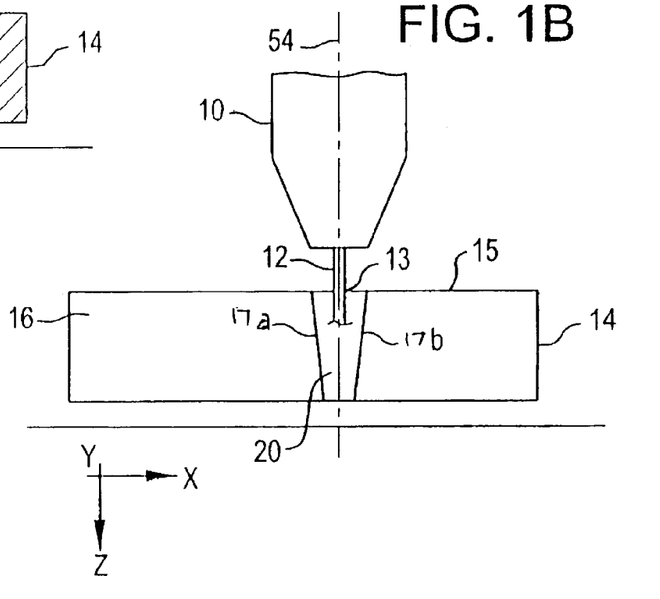
FIG. 1B illustrates a fluid-jet cutting a workpiece and a resulting taper in the target piece.

Every fluid-jet application is also affected by a bevel taper (also referred to as "taper") in the cut edges of the workpiece 14. FIG. 1B illustrates a bevel taper 20 in the cut edges 17a and 17b of the workpiece 14 formed by the jet 12. The jet 12 is truncated in FIG. 1B for clarity. Jet cutting, particularly with an abrasive fluid-jet, typically produces undesirable tapered or beveled cut edges 17a and 17b in a target piece. The widest portion of the bevel taper 18 is typically toward the place of impact 13. The bevel taper 18 looks much like a sharpened end of a pencil was dragged through the workpiece 14. The bevel taper 20 is a function of material thickness, and is generally greatest in thin material where the bevel taper 20 may be 10 degrees. In thicker material such as two-inch steel, the bevel taper 20 is much less, though still significant. The bevel taper 20 is also a function of cutting speed. The bevel taper 20 becomes less as cutting speed slows, and then as cutting speed further slows beyond a point, the bevel taper 20 reverses from that illustrated in FIG. 1B becoming narrower toward the point of impact 13.

The bevel taper 20 typically can only effectively be eliminated by tilting the nozzle 10 relative to the workpiece surface 15 along the X-axis. As used herein, "tilt" generally means an angle between the nozzle 10 and a plane formed by the workpiece surface 15 that is less than a normal angle. For example, tilting the nozzle 10 one degree generally means changing an orientation of the nozzle 10 from 90 degrees (normal) relative to a plane formed by the workpiece surface 15 to 89 degrees.

Unlike the bevel taper 20, the lag 18 may be reduced by slowing the motion 19 of the nozzle 10 across the workpiece 14. To cut complex shapes with a variety of corners and curves, the traverse speed of the motion 19 can be constantly adjusted, thus slowing the translation speed and increasing the cutting time. In addition, reducing undesirable deflection tapers requires that the fluid-jet 12 continue removing material from the cut surfaces 16 even after the fluid-jet 12 has penetrated the thickness of the workpiece 14. Another method of reducing undesirable deflection tapers is to make multiple passes with the fluid-jet 12 across the workpiece 14. These methods all increase time necessary to cut the workpiece 14.

Commercially viable five-axis machines have recently been developed that provide an ability to translate a fluid-jet cutting head along three orthogonal axes (X, Y and Z), and to rapidly tilt the tool about fourth and fifth orthogonal axes (referred to herein as X' and Y'). Such a five-axis machine is described in U.S. patent application Ser. No. 10/394,562, titled APPARATUS THAT HOLDS AND TILTS A MACHINE TOOL, filed Mar. 21, 2003, presently assigned to the assignee of the present invention, and which is incorporated herein for all purposes.

The ability provided by the five-axis machines to tilt the nozzle 10 relative to the workpiece surface 15 provides advantages for fluid-jet cutting. For straight-line cutting, the nozzle 10 and fluid-jet 12 can be orientated normal to the workpiece surface 15 with a compensation tilt to offset the taper 20, such as along the X-axis of FIGS. 1A and 1B. Undesirable lag in corners can be reduced by additionally tilting the nozzle 10 such that the fluid-jet is partially pointed in the direction of movement to offset lag, such as along the Y-axis of FIGS. 1A and 1B. Alternatively, the speed of the fluid-jet's movement 19 across the workpiece 14 can be maintained in a first cut with only a compensation tilt to minimize the taper 20, and then a subsequent cutting pass made across the workpiece 14 with the nozzle 10 additionally tilted to remove lag 18 produced in the previous cutting pass. This can be quicker than making one slow cutting pass that does not produce deflection tapers.

Existing cutting-head motion-control systems and methods typically have only a capacity to control movement of a cutting head along the X, Y and Z-axis, but lack a capacity to control the X' and Y' tilting movements of the cutting head provided by the five-axis machines. In view of the foregoing, there is a need in the art for a new and improved system and method for controlling tilting movements of the cutting head provided by the five-axis machines.

SUMMARY

An embodiment of the present invention provides a method in a computer system for automatically controlling tilt of a cutting head of a fluid-jet apparatus relative to a material being cut to produce a target piece having an overall geometry. The method includes segmenting the overall geometry into small straight lines of equal length, and receiving a speed for each of the small straight lines of the overall geometry, wherein at least two small straight lines are associated with different speeds. The method further includes automatically determining a tilt parameter for each small straight line in accordance with the speed for that small straight line, and automatically controlling the motion of the cutting head in accordance with the automatically determined tilt parameter to cut the material to produce the target piece. Each small straight line may have a length less than 0.001 inch.

Another embodiment of the invention provides a computerized method for determining a tilt parameter of a cutting head of a fluid-jet apparatus relative to a plane of a workpiece. The method includes receiving a target piece shape, describing an ordered path defining the target piece shape, and segmenting the path into small straight lines of equal length. The method further includes determining a cutting-head translation speed relative to the workpiece for each of the small straight lines, determining a tilt parameter of the cutting head with respect to the plane of the workpiece in response to a fluid jet-shape parameter for each of the small straight lines, storing the small straight lines and the determined tilt parameter associated with each small straight line in a memory, and sending the stored data to the fluid-jet apparatus. The method may include controlling the tilt of the cutting head in accordance with the tilt parameter for each small straight line as the cutting head cuts the workpiece.

These and various other features as well as advantages of the present invention will be apparent from a reading of the following detailed description and a review of the associated drawings.

BRIEF DESCRIPTION OF THE DRAWINGS

The features of the present invention which are believed to be novel are set forth with particularity in the appended claims. Aspects of the invention may best be understood by making reference to the following description taken in conjunction with the accompanying drawings. In the several figures, like referenced numerals identify like elements.

DETAIL DESCRIPTION

In the following detailed description of exemplary embodiments of the invention, reference is made to the accompanying drawings, which form a part hereof. The detailed description and the drawings illustrate specific exemplary embodiments by which the invention may be practiced. These embodiments are described in sufficient detail to enable those skilled in the art to practice the invention. It is understood that other embodiments may be utilized, and other changes may be made, without departing from the spirit or scope of the present invention. The following detailed description is therefore not to be taken in a limiting sense, and the scope of the present invention is defined by the appended claims.

Hardware

Figure 2:
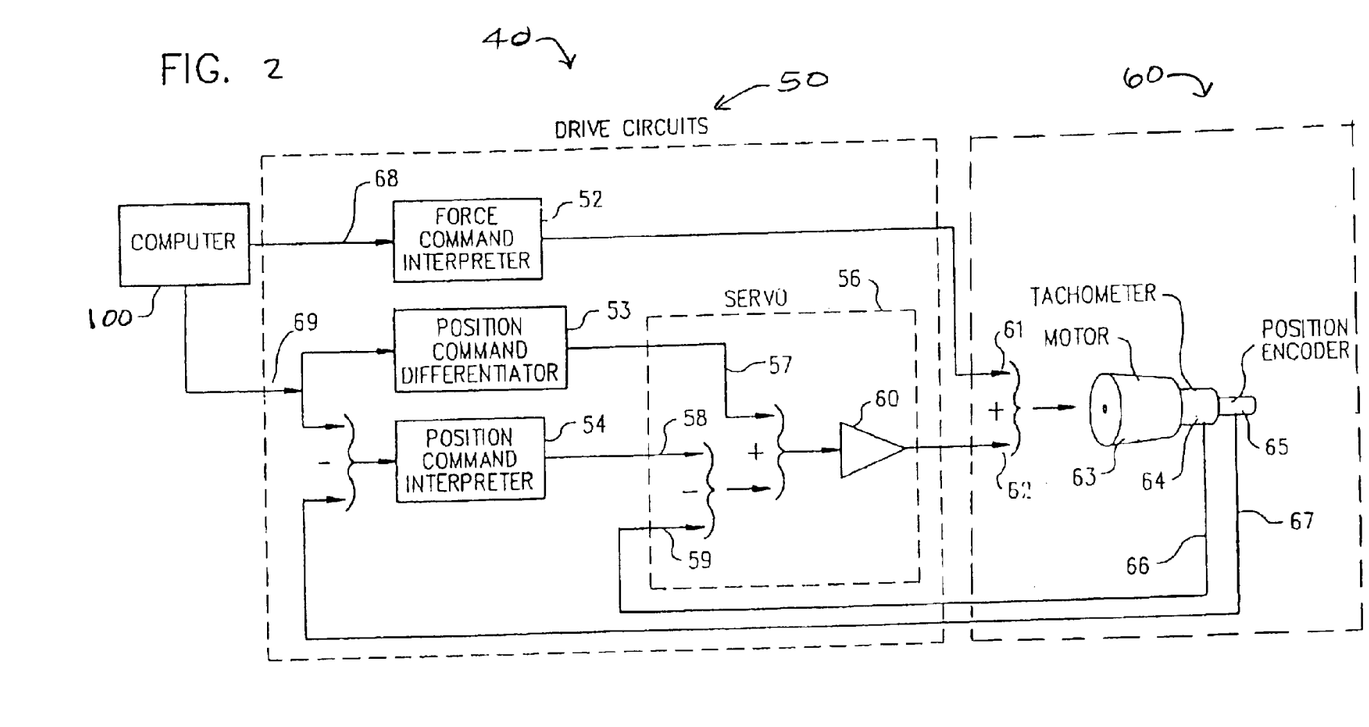
FIG. 2 illustrates hardware components of a control system 40 that automatically determines and controls a tilt parameter of a cutting head of a fluid-jet apparatus, according to an embodiment of the invention.

FIG. 2 illustrates hardware components of a control system 40 that automatically determines and controls a tilt parameter of a cutting head of a fluid-jet apparatus, according to an embodiment of the invention. The system 40 includes drive circuits 50, a cutting-head motion-control motor system 60, and a computer device 100. Exemplary drive circuits 50 include a force command interpreter 52, a position command differentiator 53, and a position command interpreter 54. Any suitable drive circuit or drive circuit component known to those skilled in the art may be used to drive the motor(s) of the cutting-head motion-control motor system 60.

An exemplary cutting head motion control motor system 60 includes a motor 63, a tachometer 64, and a position encoder 65 for each axis of movement of the cutting head (not shown). Although a stepper motor may be used with no feedback loops, an alternate embodiment uses a tachometer 64 with a velocity feedback loop 66 to a velocity servo 56 and a position feedback loop 67 from a position encoder 65 to a position command interpreter 54. For clarity, FIG. 2 only illustrates components for a single axis of movement. A five-axis cutting head typically will include a separate motor system 60 for each axis. The cutting head (not shown) may be any type of fluid-jet cutting head that is tiltable in an X' and Y' direction in response to a tilt parameter with respect to a plane of a workpiece, such as the surface 15 of FIG. 1. The cutting head is part of a fluid-jet cutting system (not shown) that also includes fluid reservoirs, pumps, an X–Y cutting table, abrasive material delivery system, and a fluid-jet nozzle.

One embodiment includes a position command differentiator circuit 53 to generate a velocity feed-forward signal 57. An alternate embodiment of the invention would allow the position command interpreter circuit to be eliminated. Velocity commands could be calculated by the computer as the time differential of position commands, and they could be sent by another signal line to a velocity command interpreter for generating the feed-forward signal. However, a position command differentiator circuit is simple and no more expensive than a velocity command interpreter circuit, and desired velocity can be computed without error from a stream of position commands over time. This alternative embodiment requires one less data line and less computation by the computer than this alternative embodiment.

Figure 3:
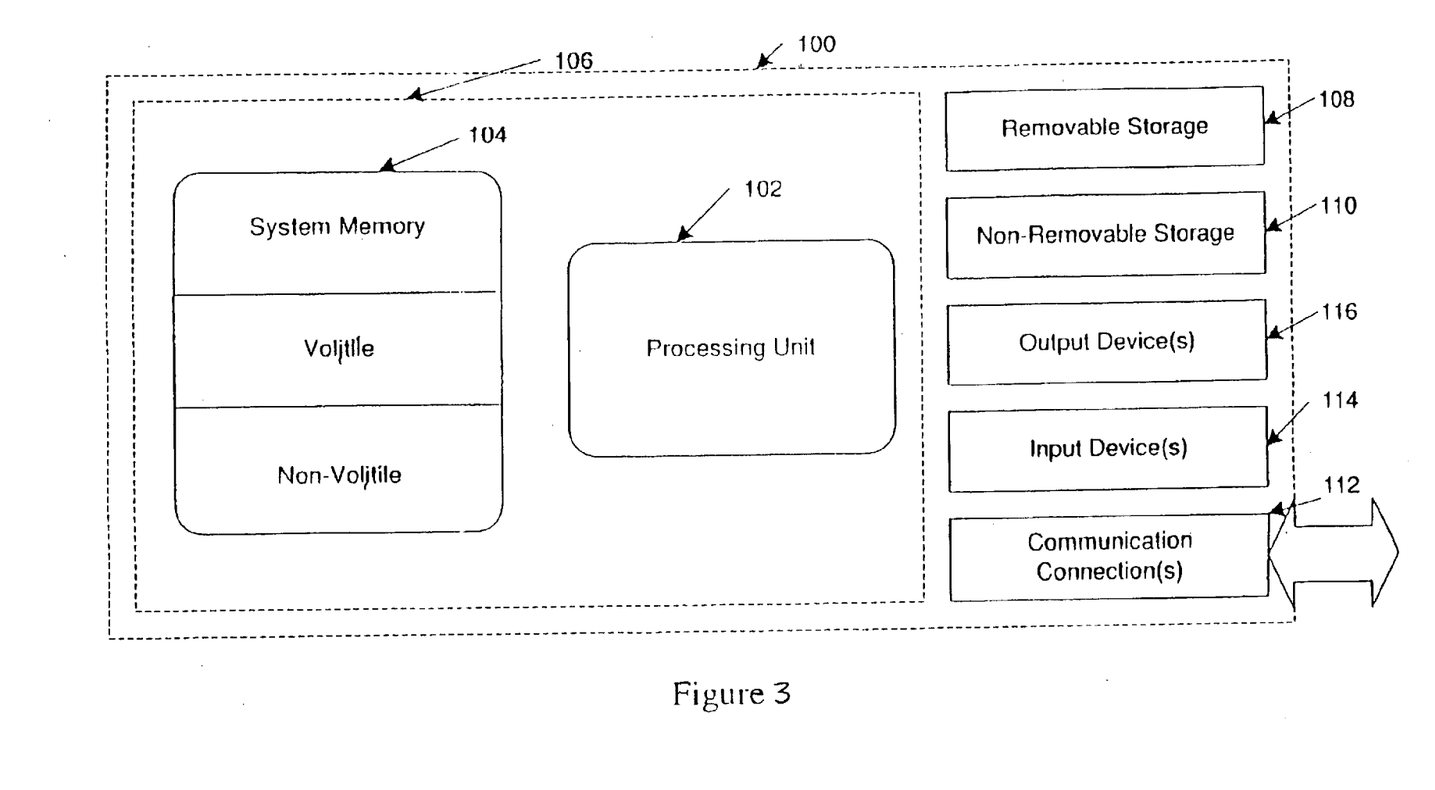
FIG. 3 illustrates an exemplary computer device 100 for implementing aspects of the invention.

FIG. 3 illustrates an exemplary computer device 100 for implementing aspects of the invention. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 3 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 3 by removable storage 108 and non-removable storage 110. Computer-storage media includes volatile and nonvolatile, removable and non-removable media implemented in any method or technology for storage of information such as computer-readable instructions, data structures, program modules or other data. Memory 104 removable storage 108 and non-removable storage 110 are all examples of computer-storage media. Computer-storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 100. Any such computer-storage media may be part of device 100.

Device 100 may also contain communications connection(s) 112 that allow the device to communicate using communications media with other devices, such as the drive circuits 50 over communications links 68 and 69. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both storage media and communication media.

Device 100 may also have input device(s) 114 such as keyboard, mouse, pen, voice-input device, touch-input device, etc. Output device(s) 116 such as a display, speakers, printer, etc. may also be included. All these devices are well know in the art and need not be discussed at length here. Some applications may not require the force command interpreter 52 or its input line 68 or output line 61.

Returning to FIG. 2, the computing device 100 is coupled with the drive circuits 50 by connectors 68 and 69, and the drive circuits are coupled to the motor system 60 by couplers 61, 62, 66, and 67.

Procedures for Use

The process for using the control system 40 to determine the cutter path and speed for cutting a two dimensional target piece (also referred to as a "part") is summarized in Table 1 below. The same methods apply to creation of three-dimensional parts.

TABLE 1

Steps for Operating Precomputation Motion Control System

-1-
Load CAD Drawing of Part
↓
-2-
Add Cutter Lead Ins and Lead Outs
↓
-3-

TABLE 1-continued

Steps for Operating Precomputation Motion Control System

Select Surface Finishes
↓
-4-
Describe an Ordered Path Defining the Part Shape
↓
-5-
Define Process Parameters
↓
-6-
Offset path for cutter width
↓
-7-
Segment the Ordered Path into Equal Small Straight Lines and Determine Axis Step Commands for X and Y Axis
↓
-8-
Determine Timing (Speed) for Each Small Straight Line
↓
-9-
Determine Tilt Parameter(s) and Tilt Commands for Each Small Straight Line
↓
-10-
Store Commands in Memory
↓
-11-
Simulate Cut, or Feed Axis Step Commands to Drives to Make Part Table 1 shows the overall procedures to go from a CAD representation of a part having an overall geometry to the part itself. If a part has only a paper drawing representation, a preliminary step is to draw it with a CAD system, an easier process than writing a cutter control program by hand.

In step 1, the CAD drawing can come from a number of CAD systems or vector-based drawing programs on the market. The data describing a target piece having a shape or overall geometry to be cut is inputted into the computer device 100 of the system 40 with a standard drawing interchange format, for example, as a DXF file, and saved in memory. If a bit-mapped drawing is used, it may be converted to a vector-based drawing with one of the automatic tracing programs available.

In step 2, the path to be followed by the cutter as it enters and leaves the work is defined by drawing it with a CAD editor. This can be done with the same CAD editor that was used to create the drawing or with any other CAD editor that can edit the interchange format. Standard lead-in and lead-out paths can be quickly inserted or the user can define special paths. This data is provided for the outer contour of the part and for each hole within the part. Then, the non-cutting paths between the holes or parts are determined.

In step 3, the user selects the precision and surface finish parameter "Q" required at each portion of the path. The non-cutting portions of the path are specified at this step. High-precision cuts are slower than rough cuts and the economics of the part production are determined by the choices at this step.

Until this point, the path drawn by the CAD program is stored more or less in the sequence in which the geometry was drawn. CAD and draw programs do not embrace the notion of a continuous path. In step 4, a beginning of the path is identified, and the program connects the geometry into a continuous path referred to as an ordered path. If it reaches a fork in the path, it zooms in to give a good view on the computer screen and asks the user which leg of the fork to follow. When the program reaches the end of a line or arc segment that it traverses without cutting, the user can choose on which side of the path to locate the cut in the new cutting region.

Steps 1 through 4 have fully specified the target piece shape to be made and the cutter path to be followed in making the target piece. It can be saved in this form as required for future use. At step 5 onward, process parameters become involved. The process parameters may be entered by a user, received from the memory 104 of the computing device 100, determined by testing, and/or acquired in another manner. The process parameters may include characteristics of the material and particular machine tool being used as described in conjunction with FIG. 7. These values may change from time to time because of wear of the cutting nozzle or other reasons. Therefore, steps 5 through 9 can be repeated frequently as required.

In step 5, the user defines the process parameters, including selection of the material being cut from a table that lists the cutting index, or estimates the cutting index by interpolating between existing values. These values are entered using the computing device 100. Alternatively, the user may execute an automated test cutting procedure that determines the cutting index for a material. Next, the material thickness is specified. These values are used by the program to determine the speeds required to achieve the precision and surface finish specified earlier. Then, the user specifies the setup of the machine in terms of nozzle sizes etc. If the part has already been cut or set up for cutting, the user simply verifies that the existing setup is still valid. At this point the user can adjust the tool offset that compensates for the width of the kerf cut by the tool.

Steps 6 through 10 are then performed automatically without user intervention. At step 11, a set of motor axis step-and-direction commands (also referred to as "actuator-step commands") and associated time delay instructions reside in memory ready to be sent to the servo systems to perform the necessary cutting. The software that performs steps 6 through 10 is described in detail in subsequent paragraphs.

In step 11 the user can check the work to date by simulating the cut on the screen or start the cutting process and make the part.

Motion Control System

Motion control is achieved by providing a timed set of axis step-and-direction commands for each motor, such as motor 63 of FIG. 2. It is well suited for controlling stepping motors, but improved system performance can be achieved by using servomotors driven by a position controller that accepts axis step-and-direction input. Various position controller manufacturers refer to axis step-and-direction input as "electronic gearing" or "handwheel mode" or "pulse input." The position as a function of time and all its derivatives are completely specified by the pulse train for each motor. The pulse train specifies what each motor is to do and the position-control system is responsible for insuring that the motor does it. It is the responsibility of the pulse-train writer to ensure that no impossible requirements such as unachievable acceleration are placed on the motor.

The method described here is only useful for what might be called predestined motion where everything about the motion is known ahead of time. It is not useful for adaptive control where the motion system must adapt to changing conditions such as in using a vision system to pick up moving parts. Within the constraint of predestined motion, it is generally useful and can handle motion in as many axes as desired. However, for purposes of illustration of the method, it is easiest to consider first only two-dimensional motion in the X–Y plane. Then, an explanation of added tilt control will follow.

Consider a line in the X–Y plane. This line can be described in the form of a table of absolute X and Y values.

An example is the table below that shows the X–Y values for a 45-degree line running from 0,0 to 1,1 in intervals of 0.1 inch. The time at which each X–Y point is reached is also shown indicating that the motion is at uniform velocity taking one second to go from 0,0 to 1,1. The same curve can be described as a series of incremental values dx and dy which are added cumulatively from a starting point (0,0) to get the absolute values of position. These steps dX and dY can be regarded as axis step commands to be sent to a stepping or servo motor where the + indicates an axis step in the positive direction. Also, the time can be expressed as the time dT to wait before sending the axis step command dX, dY to move to the next point, as shown in Table 2 below.

TABLE 2

X, Y, and Time Values for a Line

| X | Y | time | dX | dY | dT |
|---|---|------|----|----|----|
| 0 | 0 | 0 | +.1 | +1 | .1 |
| .1 | .1 | .1 | +.1 | +.1 | .1 |
| .2 | .2 | .2 | +.1 | +.1 | .1 |
| .3 | .3 | .3 | +.1 | +.1 | .1 |
| .4 | .4 | .4 | +.1 | +.1 | .1 |
| .5 | .5 | .5 | +.1 | +.1 | .1 |
| .6 | .6 | .6 | +.1 | +.1 | .1 |
| .7 | .7 | .7 | +.1 | +.1 | .1 |
| .8 | .8 | .8 | +.1 | +.1 | .1 |
| .9 | .9 | .9 | +.1 | +.1 | .1 |
| 1.0 | 1.0 | 1.0 | | | |

Each increment of specified motion commands the point of the tool to move along one of the axes, if the command for that axis is 0, or diagonal to the axes, and nothing in between. A single unit of movement on each axis, which, if the axes are orthogonal and the units of movement are equal on each axis, specifies motion at a 45 degree angle to the axes.

A line or arc can be specified to any required degree of accuracy by making the interval, which can be described as a small straight line between two points, as small as required. For example, 0.0005 inch line is small enough for jet cutting and most machining purposes, but even this is not a limit. The maximum interval length is determined by the smallest increment in which the machine tool can be commanded, which, with this invention, is likely to become smaller as higher degrees of precision are desired. The higher the accuracy, the longer the table becomes, but this is of no practical consequence because memory is very low cost.

The advantage of a long table is two fold. First, the points can be calculated before any motion begins and elaborate calculations with multiple or even non-orthogonal axes can be done. Second, the time at which the axis step command is sent is totally free and an elaborate calculation about when to send each axis step can be done. Note that the time increments do not affect in any way the shape of the curve. They only affect the velocity with which the point of the tool is commanded to move along the curve, the accelerations, and jerk. Velocities, accelerations, and jerk can be controlled by appropriate choice of the time increments dt. Additional axes of Z, X', Y', theta, phi, etc. may be included in the table with little additional difficulty.

A table such as Table 2 is generated in two steps. First, a table of distance values for the X and Y geometric axes is generated, filling in the times with increments corresponding to the maximum speeds at each point as dictated by the desired quality of resulting parameter specified by the user for that line or arc segment of the target-piece shape. It is convenient to space the X and Y entries in the table so that they represent equal distance intervals along the path being followed, but other spacing could be used as well. If substantial tilt adjustment is expected on a portion of a cutting path having relatively little translation of the head, the length of the small straight lines used to describe the cutting path can be made smaller. With the algorithm employed in one embodiment, the distance of each interval is smaller than, or equal to, the one-axis step or pulse distance of the X Y translation tool drives. This procedure is included in step 7 in Table 1. Second, some of the times are adjusted upward corresponding to slower speeds as necessary to meet maximum acceleration limits and smooth changes in acceleration to avoid jerk. This is listed as step 8 in Table 1. Both steps 7 and 8 are explained in detail below.

The axis-step command is, of course, not exactly as listed in Table 2 because the system does not command an axis step of 0.1. It is either 1 or 0 with a sign of either + or −. Consequently, the command for each axis takes only 2 bits. The time between axis steps is also represented as an integer specifying the number of timer ticks to wait before sending the next bit pattern.

The format in which the data are stored is shown in Table 3 below. This format includes the tilt axis commands which will be explained farther below.

TABLE 3

TIME AND POSITION TWO BYTE STRUCTURE
(16 BITS IN EACH BYTE)
aAbB x'X'y'Y' OOpP yYxX TTTT TTTT TTTT TTTT where:
X = X AXIS COMMAND, x = 0 IS + DIRECTION
Y = Y AXIS COMMAND, y = 0 IS + DIRECTION
X' = X' AXIS TILT COMMAND, x' = 0 IS + DIRECTION
Y' = Y' AXIS TILT COMMAND, y' = 0 IS + DIRECTION
P = PRESSURE COMMAND. IN PRECEDING 2 BITS,
00 MEANS PUMP OFF, 11 MEANS PUMP ON,
OTHERWISE pP RAMPS PRESSURE UP, DOWN, OR SAME
T = 16 BIT INTEGER GIVING TIMER TICKS TO WAIT
aA = RAMP X AXIS CURRENT UP, DOWN, OR SAME (or additional axis use)
bB = RAMP Y AXIS CURRENT UP, DOWN, OR SAME (or additional axis use)

Until this point, only maximum velocity constraints have been placed on the motion. We now adjust the time increments to ensure that we are not exceeding other constraints on the motion.

Constraints on Motion

Constraints are placed on the motion by two classes of phenomena. First, the motion cannot require velocities or accelerations larger than the motors are capable of providing, and the accelerations cannot change too rapidly and cause vibrations in the apparatus (jerk). These might be called Newtonian constraints because they are related to Newton's laws of motion. All motion systems are subject to these constraints. The computer device 100 is programmed to calculate, according to known formulas, for each increment of motion, the velocity, acceleration, and jerk, and adjusts the time delay values to meet these constraints.

The second class of constraints relates to the use of the motion. The most simple example is a maximum desired velocity dictated by tool/workpiece interaction. Another constraint is maintaining a constant velocity as a contour is traversed, a desired feature for jet-cutting processes. The control scheme outlined above can handle far more complex requirements, such as those desired in jet cutting. Algorithms for determining additional constraints for jet cutting and making the required adjustments to the time delay values are described in a subsequent section below.

Algorithm for Representation of the Ordered Path and Offset

As originally specified, the ordered path is represented by a series of lines and arcs. This is the format generally used in DXF and G-code files for machine-tool control. One embodiment uses both lines and arcs to be able to accept any CAD file, and because the smaller amount of data permits faster manipulation for the offset calculation (step 6 of Table 1). The calculation for steps 7 through 9 depends on path length and not its complexity.

The ordered path is represented as a series of arc or line segments where each segment is defined relative to its following segment with the following format:

X Y B Q where:

X,Y is the start point of the segment (the end point is the start of the next segment)

B is tangent of one-fourth the included angle of the segment (to specify the curvature)

Q is the cut quality of result specified for the line, typically received from a user at step 3.

Of course, B and Q are meaningless for the last data line in the file.

If B is positive, the rotation from X,Y to the start of the next line is counterclockwise. If B is zero, the segment is a straight line and if B is 1 it is a semicircular arc.

When B is infinite, the arc is a complete circle. To simplify the mathematics, any arc with a B greater than 1 is replaced with two arcs half as long each.

The cutting quality index Q, also referred to as quality of cut, for a variety of materials can be used with the jet parameters to calculate the maximum speed at which the jet just barely cuts through the material. The resulting surface finish is assigned a quality of 1. The top half of a material that has just barely been cut through has a much better surface finish than the bottom half. If the speed is reduced so that the jet could just cut through a piece twice as thick, the surface finish is much better. This finish is assigned a quality of 2. Moving slowly enough to cut more than five times the material thickness does not significantly improve the finish. Therefore, quality 5 is regarded as the best finish possible.

By this convention, a finish less than 1 means cutting partially through the part. For example, 0.1 is used to engrave a line on the part for decorative or other purposes. A finish of 0 means no cutting, and this is used to denote the jet-off condition for moves without cutting.

In the quality parameter Q, Q=0 means no cutting. The sign of Q is used to indicate whether the cutter should traverse to the left of the line (negative Q) or to the right of the line (positive Q). In one embodiment, Q can have only a range from −5 to +5. The magnitude of Q is used to calculate speed limitations and cutter-head control limitations to achieve the desired quality with particular materials and cutter heads.

Q is further coded to provide additional functions. If it is desired to cut right on top of the line with no offset then 100 (with the same sign as Q) is added to Q. If it is desired to stop to wait for user input after a line or arc segment is traversed, then 1000 (with the same sign as Q) is added to Q. Other functions can also be added by this means.

In step 6 of Table 1, the line and arc segments are offset by an amount equal to half the kerf width in the direction determined by the sign of Q. Lines move parallel to themselves and arcs keep the same center and change radius. If 2 segments meet in a convex corner, an arc segment is added to join the two segments. Otherwise, the segments are truncated at their new intersection point. Lines with zero offset (no cutting) are moved and stretched to meet the offset ends of the segments that they join. A transition from left offset to right offset can be made only through an intermediate non-cutting segment.

Algorithm for Segmenting Offset Path into Small Straight Lines (Step Setting)

At step 7, the curve definition table (see Tables 2 and 3) is calculated from the offset file by one of two methods depending upon whether the segment of the ordered path is a line or an arc segment. In both cases, the small straight lines (also referred to as "intervals" or "steps") are chosen so that each small straight line represents a constant or equal distance along the ordered path. In one embodiment, the interval size is equal to the smallest axis step command usable by an axis. In another embodiment, the intervals are smaller than the smallest axis step command usable by an axis. For example, the small straight-line segments may be 0.10 inch, 0.005 inch, 0.001 inch, or smaller. Satisfactory results have been obtained with small straight-line segments ranging between 0.005 inch and 0.0001 inch in length. Small lengths can allow tilt to be adjusted at every step over a series of steps while X,Y translation is adjusted at only some of the steps for relatively high tilt change compared to translation change. A small straight-line segment of about 0.0005 inch provides a suitable value for use with current motion-control programs and fluid-jet apparatus. Since a human hair is approximately 0.003 inch in diameter, six 0.0005-inch intervals are necessary to cross the equivalent of a human hair on the workpiece.

Figure 4:
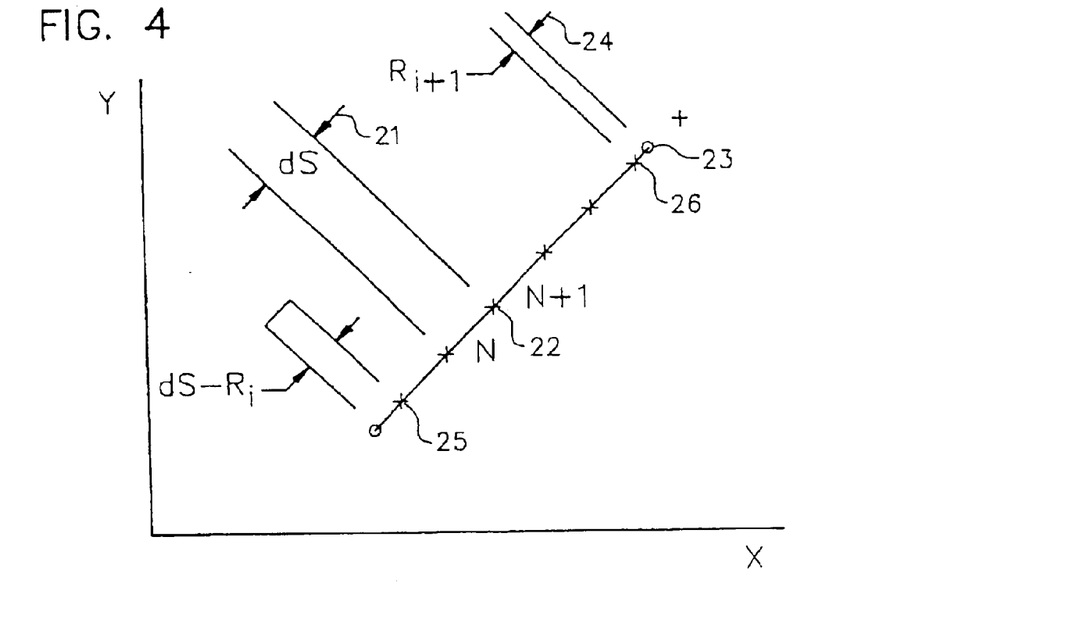
FIG. 4 shows a method of converting an input straight-line segment to incremental commanded points, according to an aspect of the invention.
Figure 5:
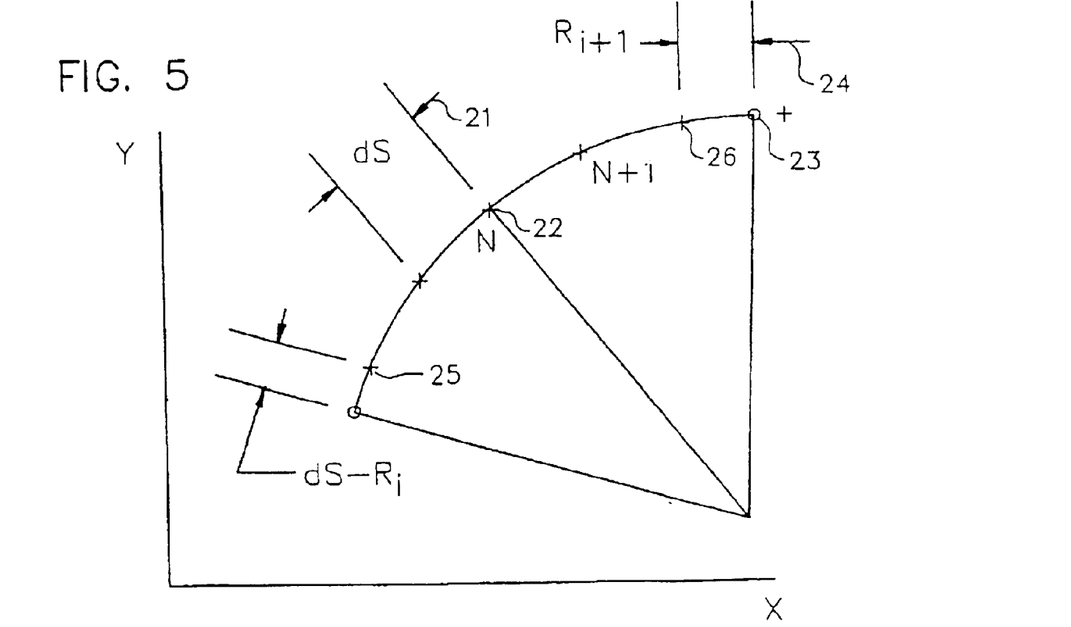
FIG. 5 shows a method of converting an input arc segment to incremental commanded points, according to an aspect of the invention.

The line and arc segment cases are illustrated in FIGS. 4 and 5, respectively. In both cases, a step, or small straight-line segment, dS 21 is taken and the new X,Y coordinates of point N 22 are calculated by known geometric methods and rounded to the axis-step resolution. If the new coordinate value, expressed in the axis-step resolution, is greater than the old, a +1 is written to the data table. If less, a −1 is written, and if the same, a 0 is written. This process continues until the whole path has been traversed by the algorithm.

As the path is traversed, the maximum speed for each small straight-line segment is determined for e ach line or arc segment being traversed. The maximum speed is taken as the lesser of the Newtonian or cutting-process limit. The time increment for the small straight-line size is divided by this speed and is written to the data file. At this stage, no attention is paid to acceleration or jerk.

When the end point of an entity 23 is passed, the amount by which it is passed, expressed as the distance R 24 from the last point N 26 to the end point 23, is used to place the first point 25 on the next entity, and the new reference point is taken as that end point. This procedure keeps the step sizes identical and ensures that errors do not accumulate as the path is traversed. Also, the angle by which the path bends at this end point is calculated and a maximum speed for traversing the corner with the particular tool and material is determined. The maximum speed may be determined considering the time required for the lag in tool position to catch up with the commanded position. In an embodiment for jet-cutting tools, the maximum speed for traversing the corner is calculated as specified in a subsequent section. The corresponding time delay is written to the file for this one point.

As mentioned previously, the axis-step size dS 21 need not be the same everywhere except that it saves calculation time by reducing calculation complexity when the time is calculated in the time setting algorithm described next. When a file of multiple megabytes is processed, this saves a substantial amount of time.

Algorithm for Time Setting

Figure 6A:
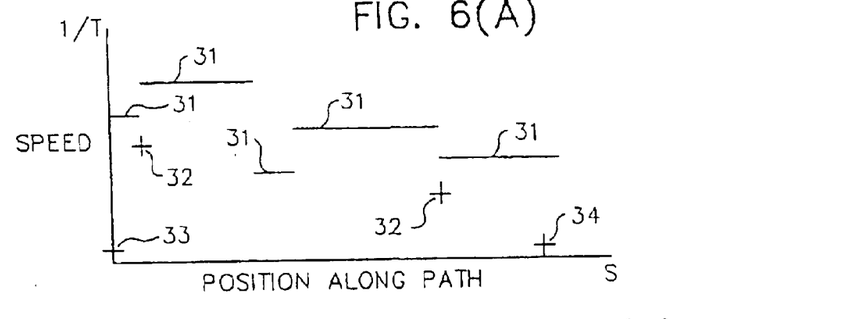
FIG. 6 shows the graphs of translation speed against position at various points, according to an aspect of the invention.

Moving to step 7, the data written to the file at this point is illustrated in FIG. 6(A). Here we see the reciprocal of the time delay, 1/T, which is proportional to the velocity at constant step size, plotted against the position along the path. Slow speeds are at the bottom of the plot and high speeds at the top. Horizontal lines 31 show regions of constant velocity along a line or arc segment, and small crosses 32 show point velocity values at line or arc segment joining points. At the two end points 33 and 34, the time delay has been set to its maximum value (1/T is a minimum) because the motion begins and ends at these points.

Figure 6B:
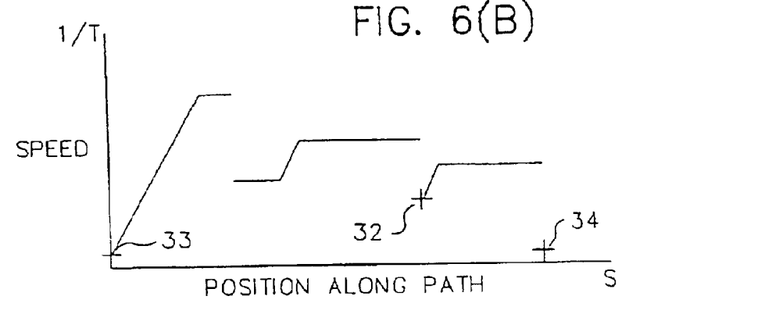

Now, the task of the algorithm is to increase the time-delay sizes of the higher points on the plot to bring them down only so far as necessary (maintaining as high a velocity as possible) to meet any acceleration limits. This is accomplished by making two sweeps through the table, one from each end, and resetting the time delays choosing the greater of the acceleration limit or the existing velocity limit. FIG. 6(B) shows the condition after a single sweep from left to right and FIG. 6(C) shows the condition after the reverse sweep.

The above process is sufficient for most applications where the mass of the tool is small and jerk is not an important concern. In FIG. 6(C), a straight line with finite slope represents a line of constant spatial acceleration (dv/ds) along the curve. Sharp points where two lines meet are points of infinite jerk (rate of acceleration change). In applications where it is important to limit jerk, the sharp points of FIG. 6(C) can be rounded with tangential arcs, while not increasing the velocity at any point, as shown in FIG. 6(D). This can be accomplished by numerous methods.

A method of limiting jerk adds an additional step between FIG. 6(A) and FIG. 6(B). The system first sweeps through the data shown in FIG. 6(A) to identify points which represent lower velocities than the points on each side. Each such point is either an isolated point of low velocity 32, 33, or 34, or one end of a line of constant velocity 31 with a higher adjoining velocity. As they are found, each such point and the adjoining points are replaced by an arc, if the arc represents a lower velocity, with a radius chosen as the jerk limit, centered above the point and tangent to the point. This replaces isolated points of low velocity with upward facing semi-circles and extends the ends of lines of relatively low velocity with quarter-circles.

Figure 6C:
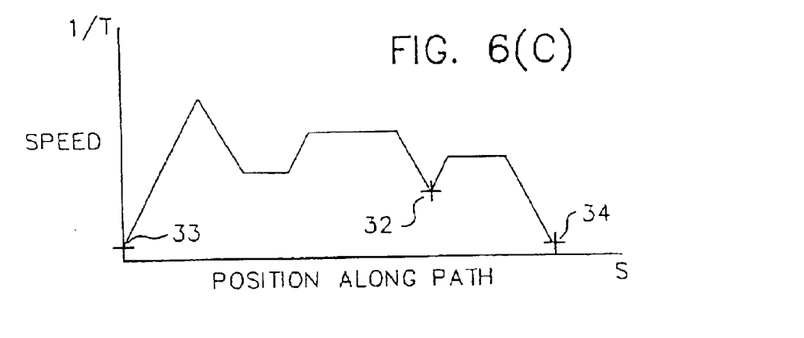
Figure 6D:
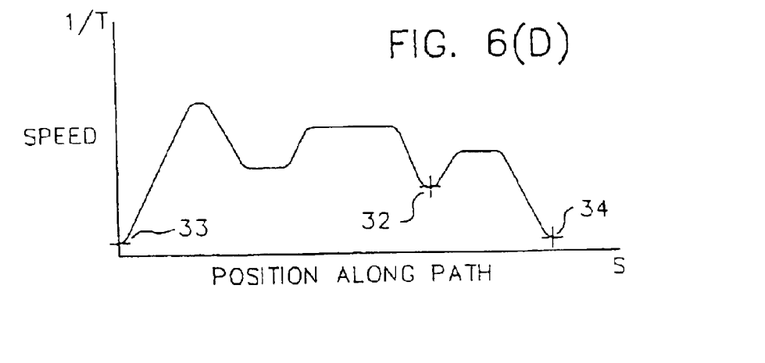

Then, the steps shown by FIGS. 6(B) and 6(C) are performed as previously described, producing data with upward facing sharp points but no downward facing sharp points. Finally, to identify the remaining sharp points, the data is swept to identify points of very high downward acceleration change. As each is found, it is replaced with an arc tangent to the lines on each side of the point (filleting). The resulting velocity profile appears as shown in FIG. 6(D).

Determine Tilt Parameters for Each Small Straight Line

Step 9 includes a determination of tilt parameter(s) for each small straight line to offset taper and lag. In the prior art, the cut-quality parameter is applied to each small straight line of the overall geometry to determine a maximum translation speed of a three-axis cutting-head for each small straight line. Next, that maximum translation speed is reduced as appropriate to compensate for Newtonian and cutting-process limits. Then, the prior art addresses taper and lag by further reducing the translation speed according to equations or lookup tables responsive to process parameters and acceptable lag or taper for the specified quality. The prior art includes U.S. Pat. No. 5,508,596 issued Apr. 16, 1996, titled MOTION CONTROL WITH PRECOMPUTATION; and U.S. Pat. No. 5,892,345 issued Apr. 6, 1999, titled MOTION CONTROL FOR QUALITY IN JET CUTTING, both of which are owned by the assignee of the instant invention, and both of which are incorporated herein by reference.

An aspect of the present invention departs from this prior art and does not further reduce the translation speed to address taper and lag. Rather, the aspect of the present invention offsets taper and lag by determining a tilt parameter for the cutting head in response to speed and a fluid jet-shape parameter and controlling tilt of a five-axis cutting head of a fluid-jet apparatus according to the tilt parameter. Commands for the two tilt axes are included in the set of motor commands as shown in Table 3 above. While one embodiment uses tilt to offset taper and lag, an alternative embodiment of the invention uses a combination of both tilt and reducing the cutting-head translation speed to offset taper and lag.

Prior to step 9 of Table 1, a cutting-head translation speed was previously determined for each small straight line of the overall target piece geometry. In one embodiment, a fluid jet-shape parameter is determined in the computing device 100 that describes the effect of the cutting jet on the portion of the workpiece being cut and provides a description about the cut-surface contour expected, including taper and lag. The parameter may be determined by reference to a computer model, such as a model specified by equations or by a look-up table, or a combination of models. The fluid jet-shape model may be developed in any manner, such as calculated from empirical data. The fluid jet-shape parameter determined from the model is responsive to cutting-head translation speeds, and may also optimally be responsive to process parameters related to the cutting head and the material being cut.

Process parameters may include, but are not limited to, jet parameters and workpiece parameters. Such parameters include, for example, the variables of material machinability, workpiece thickness, water pressure, fluid-jet forming orifice internal diameter, mixing tube internal diameter, mixing tube wear, abrasive material type, abrasive material size, abrasive material flow rate, stand-off distance, and quality index Q.

Figure 7:
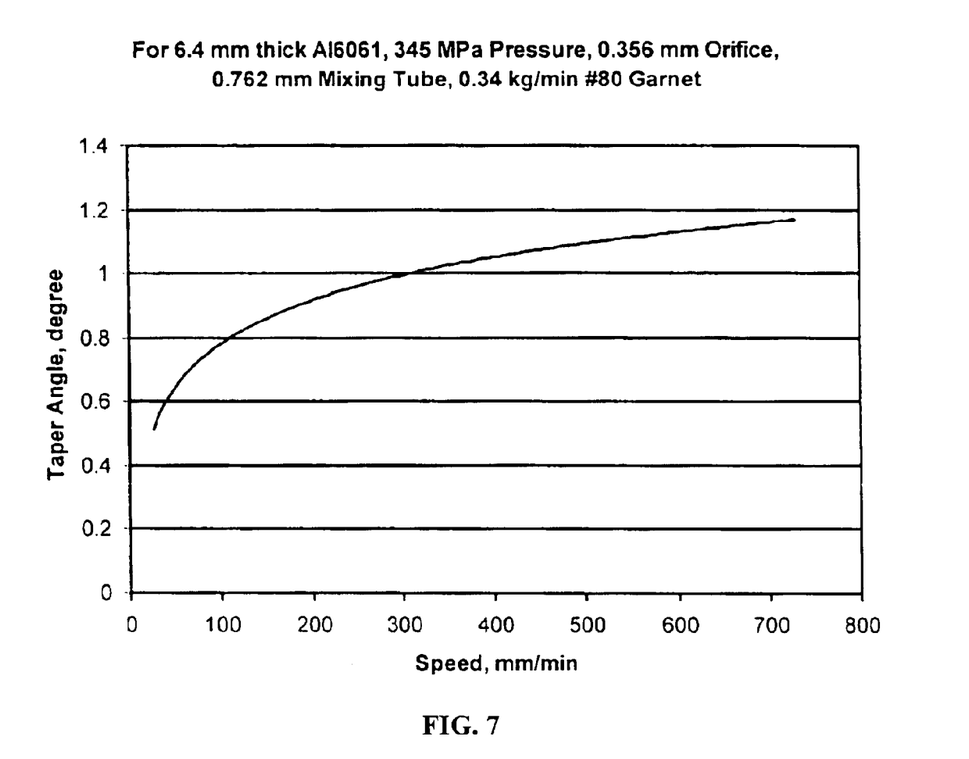
FIG. 7 graphs an instance of a fluid jet-shape parameter reflecting taper as a function of speed for a selected set of process parameters, according to an embodiment of the invention.

FIG. 7 graphs an instance of a fluid jet-shape model predicting taper as a function of speed for a selected set of process parameters, according to an embodiment of the invention. The horizontal axis of FIG. 7 represents cutting-head speed in millimeters per minute and the vertical axis represents taper angle in degrees. The process parameters are a 6.4 mm thick Aluminum 6061 workpiece material, 345 MPa water pressure, 0.356 mm orifice inside diameter, 0.762 mm mixing tube inside diameter, and 0.34-kg/min #80 garnet abrasive. By way of example, the fluid jet-shape model, as graphed by FIG. 7, predicts that a taper angle of one degree will result when the cutting-head translation speed is 300 mm/min for the above set of process parameters. FIG. 7 further predicts that the taper angle will approach 1.2 degrees as the translation speed approaches 800 mm/min.

To offset a predicted taper that would result from cutting the workpiece at 300 mm/min, the method tilts the nozzle 10 of the cutting head by one degree from normal to the plane of the workpiece surface 15 of FIG. 1B and perpendicular to the direction of jet motion 19. Because the translation speed varies along the cut path to achieve sharp corners and precise radii, the shape of the taper varies with the translation speed. Thus, the method further determines tilt parameters for tilting the cutting head nozzle 10 to different angles along the cutting path defined by the small straight lines in response to the speed at each small straight line, and optimally, to at least one of the process parameters.

A "tilt parameter" generally means tilt expressed in a convenient parameter, such as in degrees, or in motor axis steps, from normal with respect to an orthogonal axis system X' and Y', where the axis is centered at the place of impact 13 where the fluid-jet stream 12 enters the workpiece 14. Alternatively, a "tilt parameter" may be expressed in polar coordinates of a tilt angle with respect to normal as a radial coordinate and an angular coordinate.

The fluid jet-shape model also reflects lag as a function of translation speed, and optimally, at least one of the process parameters. To offset a lag L that would result from cutting the workpiece 14 of FIG. 1A, the method further determines tilt parameters for tilting the cutting head nozzle 10 such that the fluid jet 12 partially points in the direction of jet motion 19. Lag tends to flare to the outside of a radius being cut, the flare becoming greater as the radius becomes less. Thus, the method further determines a tilt parameter for tilting the cutting head nozzle 10 to different angles to offset lag flare such that the fluid jet 12 also points to the inside of the radius. As with taper, the shape of the lag varies with the translation speed. The method further determines tilt parameters for tilting the cutting head nozzle 10 to different angles along the cutting path defined by the small straight lines in response to the speed at each small straight line, and optimally to the process parameters.

The fluid jet-shape taper model, a particular instance of which is represented by FIG. 7, may be stored in the computing device 100 as a mathematical function, as a look-up table, or in any other manner known in the art for modeling a behavior with computer software. The U.S. Pat. Nos. 5,508,596 and 5,892,345 previously incorporated by reference describe certain mathematical functions used to model lag when adjusting cutting-head translation speed. In an alternative embodiment, these functions can also be used as a fluid jet-shape model for adjusting tilt. The taper model and the lag model may be combined into a single model or they mey be implemented as separate and distinct models.

Once the tilt parameters are determined for a small straight-line segment, the parameters are stored in the memory 104 of the computing device 100 of FIG. 3 along with other parameters of the small straight-line segment. When the incremental motion control commands for the X' and Y' motor axis steps are computed, the tilt motor axis steps are included. The tilt motor axis steps X' and Y' may be reflected in a table similar to Table 2, such as Table 4 below, where the X' and Y' tilt motor axis steps are illustrated as -2 and +2 respectively.

TABLE 4 dX, dY, dX', & dY' Time Values for a Line

| dX | dY | dX' | dY' | time | dX | dY | dT |
|---|---|---|---|---|---|---|---|
| 0.0 | 0.0 | -2 | +2 | 0.0 | +.1 | +1 | .1 |
| +1 | +1 | 0 | 0 | .1 | +.1 | +.1 | .1 |
| +1 | +1 | 0 | 0 | .2 | +.1 | +.1 | .1 |
| +1 | +1 | 0 | 0 | .3 | +.1 | +.1 | .1 |
| +1 | +1 | 0 | 0 | .4 | +.1 | +.1 | .1 |
| +1 | +1 | 0 | 0 | .5 | +.1 | +.1 | .1 |
| +1 | +1 | 0 | 0 | .6 | +.1 | +.1 | .1 |
| +1 | +1 | 0 | 0 | .7 | +.1 | +.1 | .1 |
| +1 | +1 | 0 | 0 | .8 | +.1 | +.1 | .1 |
| +1 | +1 | 0 | 0 | .9 | +.1 | +.1 | .1 |
| +1 | +1 | 0 | 0 | 1.0 | | | |

Table 4 illustrates a diagonal cut across a workpiece in the +X, +Y direction at a uniform speed (a function of dt) and where an X' and Y' tilt to the cutting head is added to offset taper. The edge of the target piece would be the portion of the workpiece toward the X-axis. Because the speed is illustrated as uniform across the ten 0.1 inch motor axis steps, the X' and Y' tilt to offset taper does not change once initially set to -2, +2 for the diagonal cut. Furthermore, because the speed is uniform and the cut is straight, no tilt is likely to be added by the fluid jet-shape model to compensate for lag. If, for example, the speed were changed at time 0.5 because a radius is started, the X' and Y' motor axis tilt steps in Table 4 likely would also change at time 0.5 because the fluid jet-shape model would determined new tilt parameters in response to the speed change. Furthermore, the fluid jet-shape model would likely determine a tilt parameter to offset lag that would be included in the X' and Y' motor axis tilt steps at time 0.5.

Because the increment dS used to calculate the data is no larger than the axis-step size of the drives, some of the data points will specify movement of zero in all axes including the tilt axes. To reduce the size of the file to be stored in memory, each such point can be eliminated and its time delay value is added to the adjacent point.

Algorithm for Addition of Force Commands

When the inertial force of the tool is low compared to the torques of the motors used to drive them, the force command interpreter 52 and its connecting lines shown in FIG. 2 are not required. As described above, aspects of the invention allow, without time limitations, a calculation of any factor that should be considered to determine the preferred inputs to the machine tool drives. In an aspect of the invention, the inertial forces resisting movement of each axis, including the tilt axes, are anticipated and the current directed to the motor is increased according to the prediction, reducing lag that would be induced by the greater resistance.

As the movement of the machine tool or robot arm is planned, the expected resistance forces are calculated from parameters input to the computer system. Then, when the operation is run, in addition to outputting position commands on line 69, the computer also outputs force commands on line 68. The force commands are interpreted by the force command interpreter 52 which is connected to a powerful current source (not shown) and outputs an appropriate current to the motor 61. The current supplied to the motor by this circuit varies based on the predicted resistance that the motor will experience. The conventional velocity feedback loop 66 and position feedback loop 67 are used to fine-tune the primary source of current from the force command interpreter 52.

To use a system with the optional force and interpreter requires additional procedures in steps 5 and 8 of Table 1 above. In step 5, the user also enters into the system known parameters contributing to resistance to be experienced by the motor resulting from the machine inertia.

These parameters are used as an additional process in step 8. After the ideal velocities have been fully calculated for each point, as depicted in FIG. 6(D), an additional pass is made through the data using the velocities and accelerations commanded for each drive motor to calculate the predicted resisting force that the drive motor will experience. This resisting force is then entered as a force command for the appropriate axis-by-axis step commands exactly analogous to the position commands. A positive step increases the current to the motor, and a negative step decreases it through the two bits used for current commands to each axis as shown in Table 3 above. The force command represents the resisting force that the motor is predicted to experience from the time that the position command is sent until the next position command is sent.

The force command interpreter 52 produces a constant current to the motor, as dictated by the last command received, until it receives another command.

Extra Segments for Quicker Tilting Relative to Translation

Figure 8:
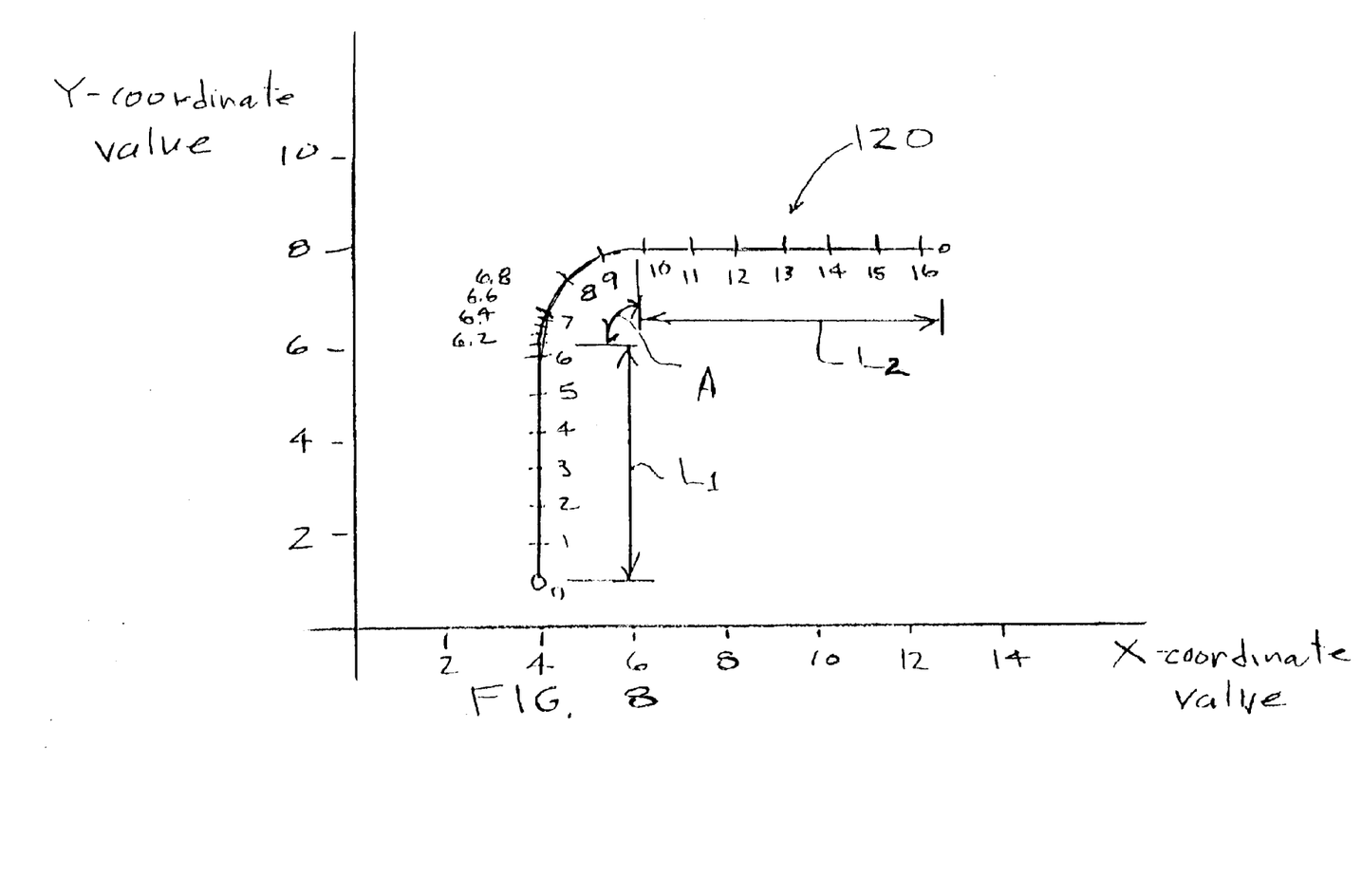
FIG. 8 graphs a portion of an ordered path for a target piece that includes an arc that joins a first line and a second line, according to an embodiment of the invention.

FIG. 8 and Table 5, shown below, illustrate another embodiment of a computerized method for determining and controlling a tilt parameter of a cutting head where additional tilting steps are included in portions of an ordered path likely to experience high tilt changes, according to an embodiment of the invention. FIG. 8 graphs a portion 120 of an ordered path for a target piece that includes an arc A that joins a line L1 and a line L2, according to an embodiment of the invention. The portion 120 of the ordered path is segmented into small straight lines 1–16 beginning at zero point. The ordered path portion 120 is graphed with respect to X and Y coordinate values.

The previously described embodiments of the invention included one determined X',Y' tilt parameter with each small straight line. Using this method, there is only room for one tilt parameter for each small straight line. However, some situations require large tilt angle changes over a short distance. The portion 120 of the ordered path graphed in FIG. 8 makes a ninety-degree change of direction or corner over a very short distance. For example, looking at taper offset only, if the corner is an inside corner of a target piece, a rapidly moving cutting head is required to move from a large +X' tilt to a zero X' tilt, and from a zero Y' tilt to a large −Y' tilt to offset taper as it traverses the arc A. Since segmenting the ordered path portion 120 into small straight lines only will result in segments 6–9 being defined and available for tilting, there may not be enough instances of the small straight lines to insert needed X' and Y' tilting commands to the motors. This alternate embodiment subsegments certain small straight lines in portions of the ordered path where large tilt angle changes are expected, providing additional data points for associating a tilt parameter with the ordered path.

Once the ordered path has been described, either before or after it is segmented at step 7, the method sweeps through the ordered path computing a rough estimate of tilt to offset taper and lag. The method then identifies portions of the ordered path where large tilt angle changes are expected by calculating a worst possible expected tilt angle change along the ordered path. These portions typically include short parts of the ordered path where significant direction changes occur, such as the arc A of the ordered path portion 120. For example, if the cutting head is expected to be moving at five inches per second translation speed along line L1, the tilt to offset taper might be four degrees +X' and zero degrees Y'. After going around the arc A, the translation speed may be expected to be five inches per second for L2 requiring a tilt parameter of zero degrees X' and four degrees −Y'. The method will identify the arc A, and optionally portions of L1 and L2 proximate to the arc A, as part of the ordered path having an anticipated large tilt change.

The ordered path is interpolated as before in step 7, and the axis step commands are determined for each small straight line. When segmenting the ordered path into equal small straight lines in step 7, the method inserts extra segments into the small straight lines for those parts of the ordered path identified as having an anticipated large tilt change. The extra segments can be one-fifth, one-tenth, one one-hundredth, or another factor of the small line segment length that provides adequate data points within one or more of the small-line segments to handle the anticipated large tilt change. For example, if the straight small-line segments have a length of 0.0005 inch, a small-line segment in a portion of the ordered path identified as an area of anticipated large tilt change is further segmented by the method into subsegments having an equal length, such as 0.0001 inch for a one-fifth factor, 0.00005 inch for a one-tenth factor, and so on. The additional subsegments, or data points, are flagged as extra small straight lines. FIG. 8 illustrates the small straight-line segment 6 having been subsegmented by a ⅕$^{th}$ factor into subsegments 6.0, 6.2, 6.4, 6.6, and 6.8. Segments 7, 8, and 9 would also be subsegmented, but this subsegmentation is not illustrated. The subsegmentation provides additional data points 6.2, 6.4, 6.6, and 6.8 for insertion of additional tilting commands. The X' and Y' tilting motors are quick enough to make tilting steps at the subsegmentation points while the X and Y-axis translation motors are moving the cutting head across the workpiece.

TABLE 5

| small straight lines | dX | dY | dX' | dY' | T | dT | |
|---|---|---|---|---|---|---|---|
| initial values | +4 | +1 | (+4°) | (0°) | | 0 | |
| 0 | 0 | 0 | 0 | 0 | 0 | 0.05 | |
| 1 | 0 | 0 | 0 | 0 | 0.05 | 0.05 | |
| 2 | 0 | +1 | 0 | 0 | 0.10 | 0.05 | |
| 3 | 0 | +1 | 0 | 0 | 0.15 | 0.05 | |
| 4 | 0 | +1 | 0 | 0 | 0.20 | 0.05 | |
| 5 | 0 | +1 | 0 | 0 | 0.25 | 0.05 | |
| 6.0 | 0 | 0 | −1 | −1 | 0.30 | 0.10 | ⎫ |
| 6.2 | 0 | 0 | −1 | −1 | 0.40 | 0.10 | ⎪ |
| 6.4 | 0 | 0 | −1 | −1 | 0.50 | 0.10 | ⎬ = 0.50 |
| 6.6 | 0 | 0 | −1 | −1 | 0.60 | 0.10 | ⎪ |
| 6.8 | 0 | 0 | −1 | −1 | 0.70 | 0.10 | ⎭ |
| 7 | 0 | 0 | (−5) | (−5) | 1.20 | 0.50 | |
| 8 | 0 | +1 | (−5) | (−5) | 1.70 | 0.50 | |
| 9 | +1 | 0 | (−5) | (−5) | 2.20 | 0.50 | |
| 10 | +1 | +1 | 0 | 0 | 2.25 | 0.05 | |
| 11 | +1 | 0 | 0 | 0 | 2.30 | 0.05 | |
| 12 | +1 | 0 | 0 | 0 | 2.40 | 0.05 | |
| 13 | +1 | 0 | 0 | 0 | 2.45 | 0.05 | |
| 14 | +1 | 0 | 0 | 0 | 2.50 | 0.05 | |
| 15 | +1 | 0 | 0 | 0 | 2.55 | 0.05 | |
| 16 | +1 | 0 | 0 | 0 | 2.60 | | |

Table 5 illustrates data for the portion 120 of the ordered path of FIG. 8 after the line L1, the line L2, and the arc A have been segmented into 16 small straight lines in step 7, and the axis step commands dX and dy determined in step 8 as before. Table 4 is similar to Table 2, except that the absolute X and Y coordinate values are not indicated. Further, according to the method, as motor axis step commands dX and dY are determined for the flagged subsegments 6.2, 6.4, 6.6, and 6.8, zeros are inserted. At the conclusion of step 7, the dX and dY-axis incremental values for steps 1–16 are determined, but the time dT reflecting the translation speed and the tilt dX' and dY' incremental parameters are not determined.

Step 8 determines the timing for the interpolated path of step 7, performing all the Newtonian and other motion calculations as before, but skipping over the flagged subsegments, such as subsegments 6.2, 6.4, 6.6, and 6.8 of FIG. 8. For purposes of illustration, segments 0–5 and 10–16 are given a dT of 0.05 seconds, and segments 6–9 are given a dT of 0.50 seconds to illustrate a slower translation speed in the arc A. The times are merely illustrative because the method, as before, will decrease the translation speed as the cutting head approaches the arc A, and increase the translation speed as the cutting head moves away from the arc. At the conclusion of step 8, the exact speed as a function of cutting quality, Newtonian limits, and other motion limits of the fluid jet-cutting system are known for each small straight-line segment.

Next, the method moves to step 9 and determines the tilt parameters for each small straight-line segment of the interpolated path in response to the fluid jet-shape parameter as before. Then, the method goes back and fills in the tilt parameters of the flagged straight-line subsegments for the motion required to move the cutting head into the determined tilt position, such as for subsegments 6.2, 6.4, 6.6, and 6.8 of FIG. 8. As described previously, the tilt parameters are determined in response to translation speed and a fluid jet-shape parameter. The fluid jet-shape parameter is responsive to process parameters, including jet parameters and workpiece parameters. For example, a study showed that seven process parameters and translation speed produced a taper aspect of the fluid jet-shape model that had a strong correlation between predicted and actual taper. These seven process parameters are abrasive material size, orifice inside diameter, water pressure, quality index Q, abrasive material flow rate, workpiece thickness, and machinability.

The method determines what the tilt angle should be at each small straight-line segment to offset taper and/or lag. The method calculates the required motion of all the X' and Y' motor actuators to move the cutting head to the tilt determined in response to the fluid jet-shape model and inserts the calculated tilt parameters into the straight-line subsegments. Using the examples described above, if the cutting head must be tilted from +4 degrees X' and 0 degrees Y' to 0 degrees X' and –4 degrees Y' between segment 6 and 10, each tilt axis moves one degree during each of small straight lines 6, 7, 8, and 9. By way of further example, if the tilt motor actuators can move a tilt axis 0.20 degrees per step, and the five subsegments 6.0, 6.2, 6.4, 6.6 and 6.8 are available for small straight line 6, and small straight lines 7, 8 and 9 have similarly been subsegmented in step 7, sufficient data points are available to move the X' and Y' tilts into position. If sufficient tilting data points are not available, then the small straight lines 6–9 need to be further subsegmented, such as by a one-tenth factor.

Table 5 illustrates the subsegmentation of the small straight line 6 and its dT according to the method. Any incremental dX and dY values for small straight line 6 would be entered at subsegment 6.0, and zeros for dX and dY then carried into the following subsegments of segment 6. Since those values are zero in the example for segment 6, incremental dX and dY values for segment 6.0 are also zero. The determined 0.50 second dT for segment 6 is apportioned to the subsegments, resulting in a 0.10 second dT for each of the five subsegments. The method interpolates the one-degree of tilt for each axis for small straight line 6 into 0.20 degrees, or one actuator motor step, for each subsegment of small straight line 6, and enters –1 step for dX' and dY' for each of the subsegments of small straight line 6. Since the small straight-line segments 7, 8, and 9 are not illustrated in FIG. 8 as subsegmented, Table 5 reflects an entry of (–5) actuator steps for these segments.

The method then moves to steps 10 and 11 as before to store the commands in the memory and make the target piece.

Other Embodiments

The various embodiments of the invention may be implemented as a sequence of computer implemented steps or program modules running on a computing system and/or as interconnected machine logic circuits or circuit modules within the computing system. The implementation is a matter of choice dependent on the performance requirements of the computing system implementing the invention. In light of this disclosure, it will be recognized by one skilled in the art that the functions and operation of the various embodiments disclosed may be implemented in software, in firmware, in special purpose digital logic, or any combination thereof without deviating from the spirit or scope of the present invention.

Some portions of the detailed descriptions are presented in terms of algorithms and symbolic representations of operations on data bits within a computing device. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, parameters, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of an electronic computing device, such as a computer system or similar device, that manipulates and transforms data represented as physical (electronic) quantities within the computer system's registers and memories into other data similarly represented as physical quantities within the computer system memories or registers or other such information storage, transmission or display devices.

The above specification, examples, and data provide a complete description of the manufacture and use of an embodiment the invention. Since many embodiments of the invention can be made without departing from the spirit or scope of the invention, the invention resides in the claims hereinafter appended.

What is claimed is:

1. A fluid-jet cutting system, comprising:

a fluid-jet cutting head tiltable in response to a tilt parameter with respect to a plane of a material being cut;

a computer having a processor, a user interface, and a memory;

computer-executable instructions stored in the memory for automatically controlling a tilt of the cutting head relative to a material being cut to produce a target piece having an overall geometry, the instructions for performing steps comprising:

segmenting the overall geometry into small straight lines of approximately equal length;

receiving a speed for each of the small straight lines of the overall geometry, wherein at least two small straight lines are associated with different speeds;

automatically determining a tilt parameter for each small straight line in accordance with the speed for that small straight line; and automatically controlling the motion of the cutting head in accordance with the automatically determined tilt parameter to cut the material to produce the target piece.

2. A fluid-jet cutting system, comprising:
   a fluid-jet cutting head tiltable in response to a tilt parameter with respect to a plane of a workpiece;
   a computer having a processor, a user interface, and a memory;
   computer-executable instructions stored in the memory computer for performing steps comprising:
   receiving a target piece shape to be cut by a cutting head of a fluid-jet apparatus from a workpiece;
   describing an ordered path defining the target piece shape;
   segmenting the path into small straight lines of approximately equal length;
   determining a cutting-head translation speed relative to the workpiece for each of the small straight lines;
   determining a tilt parameter of the cutting head with respect to the plane of the workpiece in response to the speed and a fluid jet-shape parameter for each of the small straight lines;
   storing the small straight lines and the determined tilt parameter associated with each small straight line in a memory; and
   controlling the tilt of the cutting head in accordance with the tilt parameter for each path segment as the cutting head cuts the workpiece into a shape approximating the workpiece shape.

3. A method in a computer system for automatically controlling tilt of a cutting head of a fluid-jet apparatus relative to a material being cut to produce a target piece having an overall geometry, comprising:
   segmenting the overall geometry into small straight lines of approximately equal length;
   receiving a speed for each of the small straight lines of the overall geometry, wherein at least two small straight lines are associated with different speeds;
   automatically determining a tilt parameter for each small straight line in accordance with the speed for that small straight line; and
   automatically controlling the motion of the cutting head in accordance with the automatically determined tilt parameter to cut the material to produce the target piece.

4. The method of claim 3, wherein each small straight line has a length less than 0.10 inch.

5. The method of claim 3, wherein each small straight line has a length less than 0.005 inch.

6. The method of claim 3, wherein each small straight line has a length less than 0.001 inch.

7. The method of claim 3, wherein the tilt parameter for each small straight line is also determined in accordance with at least one process parameter.

8. The method of claim 7, wherein the process parameter is selected from a group consisting of material machinability, workpiece thickness, water pressure, fluid-jet forming orifice internal diameter, mixing tube internal diameter, mixing tube wear, abrasive material type, abrasive material size, abrasive material flow rate, stand-off distance, and quality index.

9. A computerized method for determining a tilt parameter for a cutting head of a fluid-jet apparatus relative to a plane of a workpiece, comprising:
   receiving a target piece shape;
   describing an ordered path defining the target piece shape;
   segmenting the path into small straight lines of approximately equal length;
   determining a cutting-head translation speed relative to the workpiece for each of the small straight lines; and
   determining a tilt parameter for the cutting head with respect to the plane of the workpiece in response to the speed and a fluid jet-shape parameter for each of the small straight lines.

10. The method of claim 9 further comprising storing the small straight lines and the determined tilt parameter associated with each small straight line in a memory and sending the stored data to the fluid-jet apparatus.

11. The method of claim 10, wherein the fluid jet-shape parameter further includes at least one of a process parameter and a characteristic of the workpiece material.

12. The method of claim 9, wherein the small straight lines each have a length less than 0.10 inch.

13. The method of claim 9, wherein the receiving step further includes receiving a desired quality of result for at least a portion of the workpiece shape, and the determining the cutting-head translation speed step further includes determining the speed in response to the desired quality of result.

14. The method of claim 9, wherein the ordered path is described by lines and arcs.

15. The method of claim 9, wherein the cutting-head translation speed is further determined in response to at least one process parameter.

16. The method of claim 9, wherein the fluid jet-shape parameter is determined from values in a look-up table.

17. The method of claim 9, wherein the fluid jet-shape parameter computed by a mathematical function.

18. The method of claim 9, wherein the fluid jet-shape parameter determination includes a factor responsive to cutting-head translation speed.

19. The method of claim 9, wherein the tilt parameter specifies a tilt that offsets a jet-taper error.

20. The method of claim 9, wherein the tilt parameter specifies a tilt that offsets a jet-lag error.

21. The method of claim 20, further including the step of controlling the tilt of the cutting head in accordance with the tilt parameter for each small straight line as the cutting head cuts the workpiece.

22. A computer-readable medium having computer-executable instructions for automatically controlling a tilt of a cutting head of a fluid-jet apparatus relative to a material being cut to produce a target piece having an overall geometry, the instructions for performing steps comprising:
   segmenting the overall geometry into small straight lines of approximately equal length;
   receiving a speed for each of the small straight lines of the overall geometry, wherein at least two small straight lines are associated with different speeds;
   automatically determining a tilt parameter for each small straight line in accordance with the speed for that small straight line; and
   automatically controlling the motion of the cutting head in accordance with the automatically determined tilt parameter to cut the material to produce the target piece.

23. A computer-readable medium having computer-executable instructions for performing steps comprising:
   receiving a target-piece shape to be cut by a cutting head of a fluid-jet apparatus from a workpiece;

describing an ordered path defining the target piece shape;

segmenting the path into small straight lines of equal length;

determining a cutting-head translation speed relative to the workpiece for each of the small straight lines; and determining a tilt parameter of the cutting head with respect to the plane of the workpiece in response to the speed and a fluid jet-shape parameter for each of the small straight lines.

24. The computer-readable medium of claim 23, further including:

storing the small straight lines and the determined tilt parameter associated with each small straight line in a memory, and sending the stored data to the fluid-jet apparatus.

25. The computer-readable medium of claim 23, further including a step of controlling a tilt of the cutting head in accordance with the determined tilt parameter for each of small straight lines as the cutting head cuts the workpiece.

* * * * *